United States Patent
Katagiri

(10) Patent No.: US 9,752,649 B2
(45) Date of Patent: Sep. 5, 2017

(54) CARBON FIBER CORD FOR REINFORCING RUBBER PRODUCT AND RUBBER PRODUCT USING THE SAME

(71) Applicant: Nippon Sheet Glass Company, Limited, Tokyo (JP)

(72) Inventor: Shinya Katagiri, Aichi (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/762,665

(22) PCT Filed: Jan. 27, 2014

(86) PCT No.: PCT/JP2014/000402
§ 371 (c)(1),
(2) Date: Jul. 22, 2015

(87) PCT Pub. No.: WO2014/119280
PCT Pub. Date: Aug. 7, 2014

(65) Prior Publication Data
US 2015/0369336 A1    Dec. 24, 2015

(30) Foreign Application Priority Data
Jan. 30, 2013    (JP) ................................. 2013-015342

(51) Int. Cl.
| | | |
|---|---|---|
| *F16G 1/10* | (2006.01) | |
| *D06M 15/00* | (2006.01) | |
| *D06M 15/41* | (2006.01) | |
| *D06M 15/693* | (2006.01) | |
| *D02G 3/44* | (2006.01) | |
| *C08J 5/06* | (2006.01) | |
| *D02G 3/48* | (2006.01) | |

(52) U.S. Cl.
CPC ........ *F16G 1/10* (2013.01); *C08J 5/06* (2013.01); *D02G 3/446* (2013.01); *D02G 3/48* (2013.01); *D06M 15/00* (2013.01); *D06M 15/41* (2013.01); *D06M 15/693* (2013.01); *D10B 2101/12* (2013.01); *Y10T 428/2918* (2015.01)

(58) Field of Classification Search
CPC .. C08J 5/042; C08J 5/06; D06M 5/39; D06M 5/41
See application file for complete search history.

(56) References Cited

U.S. PATENT DOCUMENTS

| | | | | |
|---|---|---|---|---|
| 3,318,750 A | * | 5/1967 | Aitken | ........................ C08J 5/06 156/281 |
| 4,891,267 A | * | 1/1990 | Takahashi | .............. C08G 59/22 428/367 |
| 6,453,960 B1 | * | 9/2002 | Kondo | ........................ C08J 5/24 152/451 |
| 2007/0142621 A1 | * | 6/2007 | Reif | .......................... B60C 1/00 528/480 |
| 2008/0032130 A1 | | 2/2008 | Akiyama et al. | |
| 2008/0107913 A1 | | 5/2008 | Kajihara et al. | |
| 2010/0221520 A1 | * | 9/2010 | Tai | .............................. C08J 5/06 428/296.4 |
| 2014/0093729 A1 | | 4/2014 | Furusawa | |

FOREIGN PATENT DOCUMENTS

| | | | |
|---|---|---|---|
| EP | 2719824 | * | 4/2014 |
| GB | 1486746 A | | 9/1977 |
| JP | 58109684 A | | 6/1983 |
| JP | 63006165 A | | 1/1988 |
| JP | 03-269177 | * | 11/1991 |
| JP | 2003301334 A | | 10/2003 |
| JP | 2004285293 | | 10/2004 |
| WO | 2005098123 A1 | | 10/2005 |
| WO | 2006001385 A1 | | 1/2006 |
| WO | 2012169207 A1 | | 12/2012 |

OTHER PUBLICATIONS

Computer Translation of JP 03-269177 (1991).*

* cited by examiner

*Primary Examiner* — Robert C Boyle
(74) *Attorney, Agent, or Firm* — Abel Law Group, LLP

(57) ABSTRACT

The present invention provides a carbon fiber cord having both high bending fatigue resistance and high adhesiveness. The disclosed carbon fiber cord is a carbon fiber cord for reinforcing a rubber product. This carbon fiber cord includes a carbon fiber, a first coating layer formed on the carbon fiber, and a second coating layer formed over the first coating layer. The first coating layer contains a phenolic resin and does not contain a rubber component. The second coating layer contains a rubber component. The mass ratio of the first coating layer to the total mass of the carbon fiber and the first coating layer is in a range of 0.5% to 10%.

19 Claims, 1 Drawing Sheet

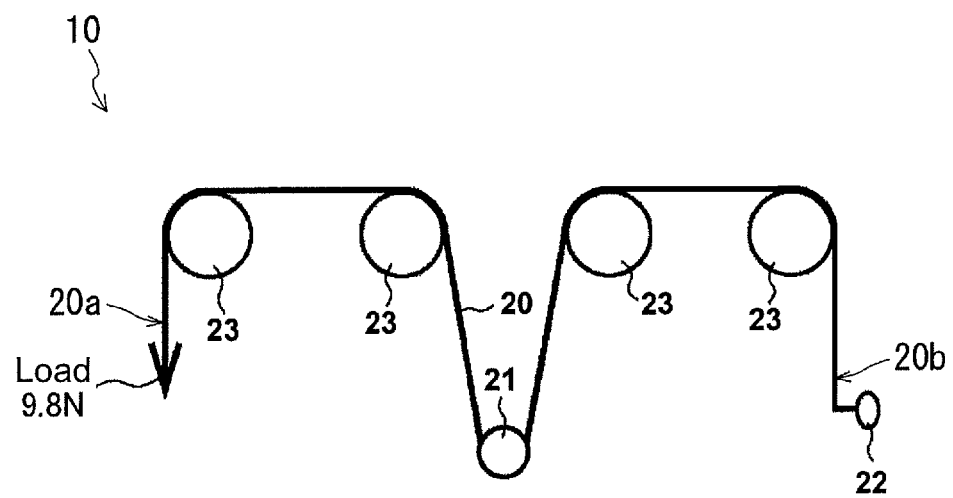

CARBON FIBER CORD FOR REINFORCING RUBBER PRODUCT AND RUBBER PRODUCT USING THE SAME

TECHNICAL FIELD

The present invention relates to a carbon fiber cord for reinforcing a rubber product and to a rubber product using the cord.

BACKGROUND ART

A rubber belt or a chain is used for driving a camshaft of an internal combustion engine of an automobile, driving an auxiliary unit such as an injection pump, or transmitting power in an industrial machine. Generally, a rubber belt includes a rubber portion and a reinforcing cord embedded in the rubber portion. Since the strength of the rubber belt depends on the strength of the reinforcing cord, the reinforcing cord is an important component that determines the life of the rubber belt. Such reinforcing cords are conventionally proposed (see, for example, Patent Literature 1).

Glass fibers have mainly been used as reinforcing fibers for use in cords for reinforcing rubber products. However, with recent developments in science and technology, the cases where glass fibers cannot adequately meet the performance requirements for reinforcing fibers have been increasingly reported. Therefore, as alternatives to glass fibers, various types of reinforcing fibers such as aramid fibers, polyparaphenylene benzobisoxazole fibers, and carbon fibers have been studied. Among these types of fibers, carbon fibers are particularly preferred as reinforcing fibers due to their advantages of high strength and high elastic modulus.

CITATION LIST

Patent Literature

Patent Literature 1: WO 2006/001385 A1

SUMMARY OF INVENTION

Technical Problem

However, in recent years, carbon fibers have been expected to have higher bending fatigue resistance to meet the requirements for higher performance of reinforcing cords. In addition, carbon fibers have the disadvantage of being less adhesive to a matrix rubber when they are used as reinforcing fibers. So, one of the objects of the present invention is to provide a carbon fiber cord having both high bending fatigue resistance and high adhesiveness.

Solution to Problem

In order to achieve the above object, the present invention provides a carbon fiber cord for reinforcing a rubber product. This carbon fiber cord includes: a carbon fiber; a first coating layer formed on the carbon fiber; and a second coating layer formed over the first coating layer. The first coating layer contains a phenolic resin and does not contain a rubber component. The second coating layer contains a rubber component. The mass ratio of the first coating layer to the total mass of the carbon fiber and the first coating layer is in a range of 0.5% to 10%.

Advantageous Effects of Invention

According to the present invention, it is possible to obtain a carbon fiber cord having both high bending fatigue resistance and high adhesiveness.

BRIEF DESCRIPTION OF DRAWINGS

FIG. 1 is a diagram schematically showing a bending test performed in Examples.

DESCRIPTION OF EMBODIMENTS

Embodiments of the present invention are described below. In the following description, the embodiments of the present invention will be described by way of examples, but the present invention is not limited to the examples described below. In the following description, specific numerical values and materials may be given as examples, but the other numerical values and materials may be used as long as the effects of the present invention can be obtained. Furthermore, the compounds described below may be used alone or in combination of two or more thereof, unless otherwise specified.

(Carbon Fiber Cord)

The carbon fiber cord of the present invention for reinforcing a rubber product is described below. The carbon fiber cord of the present invention includes a carbon fiber, a first coating layer formed on the carbon fiber, and a second coating layer formed over the first coating layer. The first coating layer contains a phenolic resin and does not contain a rubber component. The second coating layer contains a rubber component. The mass ratio of the first coating layer to the total mass of the carbon fiber and the first coating layer is in a range of 0.5% to 10%.

In the carbon fiber cord of the present invention, the carbon fiber is protected by the resin component in the first coating layer. Therefore, the carbon fiber is less susceptible to damage by abrasion and the bending fatigue resistance of the resulting carbon fiber cord is improved. In addition, the use of the resin component increases the adhesion between the carbon fiber and the first coating layer, resulting in an increase in the adhesive strength of the carbon fiber cord.

The carbon fiber is not particularly limited, and a known carbon fiber used as a reinforcing fiber may be used. The reinforcing fiber contained in the carbon fiber cord of the present invention consists essentially of carbon fiber but may contain a small amount of fibers other than carbon fiber as long as the effects of the present invention can be obtained. The content of the carbon fiber in the reinforcing fibers contained in the carbon fiber cord of the present invention is usually 99 mass % or more, and typically 100 mass %. The carbon fiber may be a bundle of carbon fiber filaments.

The carbon fiber cord of the present invention may contain only one carbon fiber or may contain two or more carbon fibers. In the case where the carbon fiber cord of the present invention contains two or more carbon fibers, they may be primarily twisted. The primarily-twisted carbon fibers may be finally twisted into a cord. The number of the finally-twisted fibers is not particularly limited, and may be in a range of 2 to 10, or may be more than 10. The number of primary twists and the number of final twists are not particularly limited. Usually, the number of primary or final twists is in a range of 0.1 to 8.0 twists per 25 mm, preferably, in a range of 0.6 to 4.0 twists per 25 mm. The method of twisting is also not limited. The twisting can be performed by any commonly used method using a flyer twisting machine, a ring twisting machine, or the like. The primary twisting and the final twisting may be performed in the same direction or in different directions. The bending fatigue resistance of the cord can be improved by performing the primary twisting and the final twisting in the same direction.

The number of filaments in a carbon fiber is, for example, in a range of 500 to 48000. The type of the carbon fiber filaments is not particularly limited. The diameter of the carbon fiber filaments is not particularly limited. The diameter of the carbon fiber filaments is preferably in a range of 4 µm to 12 µm, more preferably in a range of 5 µm to 8 µm, and even more preferably in a range of 5 µm to 7 µm.

(First Coating Layer)

The first coating layer is a coating layer that is formed directly on the carbon fiber. As described above, the first coating layer is a coating layer that contains a phenolic resin and does not contain a rubber component. As used herein, the phenolic resin refers to a copolymer of a phenolic compound (including phenol) and formaldehyde. The phenolic compound refers to an aromatic hydrocarbon (such as benzene or naphthalene) having an aromatic hydrocarbon ring and at least a hydroxyl group (—OH) bonded thereto. Examples of the phenolic compound include phenol (monophenol), diphenol, halogenated phenol, alkylphenol, nitrophenol, phenolsulfonic acid, and naphthol. Examples of the diphenol includes resorcin (resorcinol), catechol, and hydroquinone. Examples of the halogenated phenol include chlorophenol and bromophenol. Examples of the alkylphenol include cresol and butylphenol.

The phenolic resin may be a copolymer of two or more phenolic compounds and formaldehyde. For example, the phenolic resin may be a copolymer of resorcin, a phenolic compound other than resorcin, and formaldehyde. In this case, the phenolic compound may be parachlorophenol or phenol. Specifically, the phenolic compound is, for example, "Denabond" manufactured by Nagase ChemteX Corporation, or "Yukaresin" (for example, product number KE910 or KE912) manufactured by Yoshimura Oil Chemical Co., Ltd.

In the carbon fiber cord of the present invention, the mass ratio of the first coating layer to the total mass of the carbon fiber and the first coating layer is in a range of 0.5% to 10%, preferably in a range of 1.0% to 6.0%, and more preferably in a range of 2.0% to 4.0%.

(Other Coating Layers)

The second coating layer usually contains a rubber component. Examples of the rubber component contained in the second coating layer include butadiene-styrene copolymer, dicarboxylated butadiene-styrene copolymer, butadiene rubber, dichlorobutadiene, vinylpyridine-butadiene-styrene terpolymer, chloroprene, chlorosulfonated polyethylene, acrylonitrile-butadiene copolymer, and hydrogenated nitrile rubber (H-NBR). The hydrogenated nitrile rubber may be a carboxyl-modified hydrogenated nitrile rubber.

The second coating layer can be formed using a second treatment agent described later. The mass ratio of the second coating layer to the total mass of the carbon fiber, the first coating layer, and the second coating layer is, for example, in a range of 5% to 30%, preferably in a range of 10% to 25%, and more preferably in a range of 13% to 19%.

The carbon fiber cord of the present invention may further include a third coating layer formed over the second coating layer. The adhesiveness to the matrix rubber can be further increased by forming the third coating layer. The mass ratio of the third coating layer to the total mass of the carbon fiber, the first coating layer, the second coating layer, and the third coating layer is, for example, in a range of 0.5% to 8.0%, preferably in a range of 1.0% to 5.0%, and more preferably in a range of 1.8% to 3.8%.

(Example of Production Method of Carbon Fiber Cord)

An example of the method for producing the carbon fiber cord of the present invention is described below. First, a carbon fiber is prepared. Next, the first coating layer is formed over the carbon fiber. The first coating layer can be formed using a first treatment agent for forming the first coating layer. Specifically, the first treatment agent is applied to the carbon fiber and then drying the first treatment agent to form the first coating layer.

The first treatment agent contains the component of the first coating layer. Specifically, the first treatment agent contains the above-mentioned phenolic resin and does not contain a rubber component (such as latex). An example of the first treatment agent is an aqueous treatment agent containing the above-mentioned phenolic resin dispersed in water.

After the first coating layer is formed, the second coating layer is formed over the first coating layer. The second coating layer can be formed using a second treatment agent for forming the second coating layer. Specifically, the second treatment agent is applied over the first coating layer and then drying the second treatment agent to form the second coating layer.

Examples of the second treatment agent include an aqueous treatment agent containing the above-mentioned rubber component dispersed in an aqueous solvent. An example of the second treatment agent is a second aqueous treatment agent (see Table 1) used in Example 1 described below. A treatment agent disclosed as a treatment agent for forming a coating layer in WO 2006/001385 A1 may be used as the second treatment agent.

The second treatment agent usually contains a crosslinking agent in addition to the rubber component. A known crosslinking agent can be used as the crosslinking agent. A typical example of the second treatment agent is an aqueous treatment agent but not a so-called RFL liquid. The RFL liquid is a treatment liquid containing, as a main component, a mixture of a rubber latex and an initial condensate of resorcin and formaldehyde. A typical example of the second treatment agent is an aqueous treatment agent that contains a rubber latex and a crosslinking agent and does not contain an initial condensate of resorcin and formaldehyde. In this example, for example, the content of the crosslinking agent may be 5 to 100 parts by mass per 100 parts by mass of the rubber latex. Another typical example of the second treatment agent may contain a filler such as carbon black or silica, a resin, a plasticizer, an antioxidant, a stabilizer, a metal oxide, etc. in addition to the rubber latex and the crosslinking agent.

As the crosslinking agent, for example, a quinone dioxime-based crosslinking agent such as p-quinone dioxime may be used. A methacrylate-based crosslinking agent such as lauryl methacrylate or methyl methacrylate may also be used. An allyl-based crosslinking agent such as DAF (diallyl fumarate), DAP (diallyl phthalate), TAC (triallyl cyanurate), or TRIC (triallyl isocyanurate) may be used. A maleimide-based crosslinking agent (maleimide or a maleimide derivative) such as bis-maleimide, phenyl-maleimide, or N,N'-m-phenylene-dimaleimide may be used. A diisocyanate compound (organic diisocyanate) may be used. A polyisocyanate compound or an aromatic nitroso compound may be used. Sulfur or any other crosslinking agent also may be used. It is preferable to use, among these, at least one selected from a diisocyanate compound, a polyisocyanate compound, an aromatic nitroso compound, and a maleimide-based crosslinking agent. For example, a maleimide-based crosslinking agent is preferably used. The use of any of these crosslinking agents can specifically increase the adhesion between the reinforcing fiber and the matrix rubber.

The method for applying the first treatment agent and the second treatment agent is not limited, and any known method may be employed. For example, the carbon fiber or the cord may be immersed in the treatment agent. The method and conditions for drying the applied treatment agent are not particularly limited, and any known method may be employed. For example, the treatment agent may be dried in an atmosphere of 80° C. to 300° C. for 0.1 to 3 minutes to remove water. The method for forming the third coating layer is also not particularly limited, and any known method may be employed.

(Rubber Product)

The rubber product of the present invention contains the carbon fiber cord of the present invention. The rubber product of the present invention is reinforced by the carbon fiber cord of the present invention. The rubber product is not particularly limited. Examples of the rubber product of the present invention include tires for automobiles and bicycles, and transmission belts. Examples of the transmission belts include synchronous transmission belts and friction transmission belts. Examples of the synchronous transmission belts include toothed belts typified by a timing belt for an automobile. Examples of the friction transmission belts include flat belts, round belts, V belts, and V-ribbed belts.

The rubber product of the present invention is formed by embedding the carbon fiber cord of the present invention in a rubber composition (a matrix rubber). The method for embedding the carbon fiber cord into the matrix rubber is not particularly limited, and any known method may be employed. The rubber product of the present invention (for example, a rubber belt) contains the carbon fiber cord of the present invention embedded therein. Therefore, the rubber product of the present invention has high bending fatigue resistance. Accordingly, the rubber product of the present invention is particularly suitable for use as a timing belt for a vehicle engine.

The rubber of the rubber composition in which the carbon fiber cord of the present invention is to be embedded is not particularly limited. The rubber may be chloroprene rubber, chlorosulfonated polyethylene rubber, ethylene propylene rubber, hydrogenated nitrile rubber, or the like. At least one rubber selected from a hydrogenated nitrile rubber and a hydrogenated nitrile rubber containing a zinc acrylate derivative dispersed therein is preferred from the viewpoints of water resistance and oil resistance. The matrix rubber may further contain a carboxyl-modified hydrogenated nitrile rubber. From the viewpoint of adhesion, it is preferable that the outermost coating layer of the carbon fiber cord and the rubber composition in the rubber product contain the same type of rubber or consist of the same type of rubber.

EXAMPLES

Hereinafter, the present invention is described in more detail by way of examples.

Example 1

First, 6000 carbon fiber filaments were bundled together to obtain a bundle of filaments. The carbon fiber filaments having an average diameter of 7 μm were used. Next, the bundle of carbon fiber filaments was immersed in the first aqueous treatment agent. As the first aqueous treatment agent, a treatment agent containing a parachlorophenol-resorcin-formaldehyde copolymer dispersed in water was used. Specifically, a solution obtained by diluting Denabond (Nagase ChemteX Corporation) with water to 8 times was used as the first aqueous treatment agent.

Hereinafter, the first aqueous treatment agent used in Example 1 may be referred to as a "treatment agent (A)".

Next, the carbon fiber to which the first aqueous treatment agent had been applied were dried at 150° C. for 2 minutes. Thus, a carbon fiber cord having the first coating layer was obtained. The second aqueous treatment agent shown in Table 1 was applied to this carbon fiber cord and dried at 200° C. for 2 minutes. Thus, the second coating layer was formed.

TABLE 1

| | Components | Solid content ratio (parts by mass) |
|---|---|---|
| Aqueous treatment agent | Carboxyl-modified hydrogenated nitrile rubber latex (*1) | 100 |
| | 4,4'-bismaleimide diphenylmethane | 10 |
| | Polyisocyanate | 10 |
| | Silica | 5 |

(*1) Zetpol Latex (carboxyl-modified and hydrogenated type: manufactured by Zeon Corporation)

Next, the carbon fiber cord on which the second coating layer had been formed was twisted at a rate of 2.0 twists per 25 mm in one direction. In Example 1, the first coating layer was formed so that the mass ratio of the first coating layer to the total mass of the carbon fiber and the first coating layer was 0.5%. The second coating layer was formed so that the mass ratio of the second coating layer to the total mass of the carbon fiber, the first coating layer, and the second coating layer was 16%.

Next, the third treatment agent having the composition shown in Table 2 was applied onto the second coating layer and dried. Thus, the third coating layer was formed on the cord obtained as above. The mass ratio of the third coating layer to the total mass of the carbon fiber, the first coating layer, the second coating layer, and the third coating layer was 3.0%. Thus, the carbon fiber cord of Example 1 was obtained.

TABLE 2

| Components | Ratio (parts by mass) |
|---|---|
| Chemlok 233X (*1) | 100 |
| Xylene | 100 |

(*1) Manufactured by Lord Far East Incorporated

Examples 2 to 11

Carbon fiber cords of Examples 2 to 11 were produced under the same conditions as those of Example 1, except that the mass ratios of the first and second coating layers were different from those of Example 1. Table 4 below shows the mass ratios of these coating layers. The mass ratio of the third coating layer to the total mass of the entire cord was the same as that of Example 1 (the same applies to Examples and Comparative Examples below).

Examples 12 to 17

Carbon fiber cords of Examples 12 to 17 were produced under the same conditions as those of Example 1, except that the first aqueous treatment agent and the mass ratios of the first and second coating layers to the total mass of the entire cord were different from those of Example 1. Table 5 below shows the mass ratios of these coating layers.

In Examples 12 to 17, a treatment agent containing a phenol-resorcin-formaldehyde copolymer dispersed in water was used as the first aqueous treatment agent. Specifically, a solution obtained by diluting Yukaresin (product number "KE912") manufactured by Yoshimura Oil Chemical Co., Ltd. with water to 8 times was used as the first aqueous treatment agent. Hereinafter, the first aqueous treatment agent used in Examples 12 to 17 may be referred to as a "treatment agent (C)".

Comparative Example 1

In Comparative Example 1, the first coating layer containing a phenolic resin was not formed. The second coating layer was formed by applying a RFL liquid and drying it. Here, a treatment liquid containing a mixture of a modified hydrogenated nitrile rubber latex and an initial condensate of resorcin and formaldehyde was used as the RFL liquid. The mass ratio of the second coating layer to the total mass of the carbon fiber and the second coating layer was 20%.

Comparative Examples 2 to 4

In Comparative Examples 2 to 4, the first coating layer containing a phenolic resin was not formed. The second coating layer was formed by applying the second aqueous treatment agent used in Example 1 and drying it. The mass ratio of the second coating layer to the total mass of the carbon fiber and the second coating layer varied from example to example. Table 6 below shows the mass ratio of each second coating layer.

Comparative Examples 5 to 8

In Comparative Examples 5 to 8, carbon fiber cords of Comparative Examples 5 to 8 were produced under the same conditions as those of Example 1, except that the mass ratios of the first and second coating layers were different from those of Example 1. Table 6 below shows the treatment agents used to form these coating layers and the mass ratios of the coating layers. The mass ratio of each third coating layer to the total mass of the entire cord was the same as that of Example 1.

The carbon fiber cords produced as above in Examples and Comparative Examples were each embedded in a matrix rubber having the composition shown in Table 3. Thus, a flat belt of 10 mm wide, 300 mm long, and 3 mm thick was formed.

TABLE 3

| Components | Mass ratios |
| --- | --- |
| Hydrogenated nitrile rubber (*1) | 70 |
| Hydrogenated nitrile rubber containing zinc dimethacrylate (*2) | 30 |
| Zinc oxide | 10 |
| Stearic acid | 1 |
| Carbon black | 30 |
| Trioctyl trimellitate | 5 |
| Sulfur | 0.1 |
| 1,3-bis(t-butylperoxyisopropyl)benzene | 6 |
| Magnesium oxide | 1 |

TABLE 3-continued

| Components | Mass ratios |
| --- | --- |
| 4,4'-($\alpha,\alpha$-dimethylbenzyl)diphenylamine | 0.5 |
| 2-mercaptobenzimidazole zinc salt | 0.5 |
| Triallyl isocyanurate | 1 |

(*1) Zetpol 2020 (manufactured by Zeon Corporation)
(*2) Zetpol 2000L (manufactured by Zeon Corporation)

The flat belt thus obtained was subjected to a bending test in which the belt was bent 50000 times and 100000 times, respectively. The bending test was performed using a bending tester 10 shown in FIG. 1. For each test sample, the tensile strengths before and after the bending test were measured. Herein, the tensile strength refers to the breaking strength obtained by performing a tensile test using a commonly used tensile tester and a commonly used cord grip. The unit of the tensile strength is N/belt.

The bending tester 10 in FIG. 1 includes a flat pulley 21 (with a diameter of 10 mm), four guide pulleys 23, and a motor 22. First, a test sample 20 (flat belt) obtained was placed on the five pulleys. Then, one end 20a of the test sample 20 was weighted to apply a load of 9.8 N to the test sample 20. With one end 20a of the test sample 20 being weighted, the other end 20b thereof was reciprocated by the motor 22 so that the test sample 20 was repeatedly bent on the flat pulley 21. The bending test was performed at room temperature. After the bending test of the test sample 20 was performed in this manner, the tensile strength after the bending test was measured.

Then, for each test sample, the ratio of the tensile strength after the bending test to the tensile strength (100%) before the bending test, that is, the strength retention (%), was obtained. The higher the value of the strength retention is, the higher the bending fatigue resistance is. Tables 4 to 6 below show the strength retentions after the 50000-times bending test and the strength retentions after the 100000-times bending test as the "strength retentions (1)" and the "strength retentions (2)" respectively.

Furthermore, the carbon fiber cords obtained were subjected to an adhesion test to evaluate the adhesiveness to the matrix rubber. Specifically, first, a canvas, a carbon fiber cord, and a matrix rubber sheet were stacked in this order, and the resulting stack was pressed under the conditions of 160° C. and 30 minutes. Thus, a test sample for the adhesion test was obtained. The dimensions of the test sample was 25 mm wide, 150 mm long, and 3 mm thick. A rubber containing hydrogenated nitrile rubber as a main component was used as the matrix rubber. In the adhesion test, first, the carbon fiber cord and the matrix rubber were held between the upper and lower chucks of a tensile tester. Next, the cord was removed from the matrix rubber, and how the test sample was broken was observed. Tables 4 to 6 show the results. In Tables 4 to 6, "rubber broken" refers to the state in which the carbon fiber cord and the matrix rubber are not separated at the interface therebetween but the matrix rubber is cracked and broken. In Tables 4 to 6, "spotted" refers to the state in which the carbon fiber cord and the matrix rubber are almost separated at the interface therebetween but the matrix rubber is broken in spots. The case of "rubber broken" indicates that the adhesive strength between the reinforcing cord and the matrix rubber is higher, that is, the adhesive strength between the carbon fiber and the coating layer is higher, than the case of "spotted".

Table 4 to 6 show the residual rubber ratios. The residual rubber ratio indicates the percentage of the area of a region of the cord on which the rubber remains after the cord is removed from the rubber in the adhesion test, relative to the total area of the adhesive surface of the cord of the test sample. A residual rubber ratio of less than 80% indicates poor adhesion, a residual rubber ratio of 80% or more and less than 90% indicates good adhesion, and a residual rubber ratio of 90% or more indicates better adhesion.

Tables 4 to 6 show the conditions for producing the carbon fiber cords of Examples and Comparative Examples and the evaluation results thereof.

TABLE 4

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| First coating layer | Treatment agent | A | A | A | A | A | A | A | A | A | A | A |
| | Mass ratio (mass %) (*1) | 0.5 | 1.0 | 1.0 | 1.0 | 3.0 | 3.0 | 3.0 | 3.0 | 3.0 | 6.0 | 10 |
| Mass ratio of second coating layer (mass %) (*2) | | 16 | 14 | 16 | 18 | 11 | 14 | 16 | 18 | 22 | 16 | 16 |
| Strength retention (1) | | 77% | 82% | 88% | 83% | 85% | 94% | 97% | 96% | 91% | 89% | 80% |
| Strength retention (2) | | 73% | 70% | 78% | 73% | 78% | 87% | 88% | 89% | 79% | 78% | 61% |
| Residual rubber ratio (%) | | 90 | 90 | 90 | 90 | 90 | 95 | 95 | 95 | 90 | 90 | 90 |
| Degree of breakage | | Rubber broken | Rubber broken | Rubber broken | Rubber broken | Rubber broken | Rubber broken | Rubber broken | Rubber broken | Rubber broken | Rubber broken | Rubber broken |

(*1) indicates the mass ratio of the first coating layer to the total mass of the carbon fiber and the first coating layer.

(*2) indicates the mass ratio of the second coating layer to the total mass of the carbon fiber, the first coating layer, and the second coating layer.

TABLE 5

| | | Examples | | | | | |
|---|---|---|---|---|---|---|---|
| | | 12 | 13 | 14 | 16 | 16 | 17 |
| First coating layer | Treatment agent | C | C | C | C | C | C |
| | Mass ratio (mass %) (*1) | 0.5 | 1.0 | 3.0 | 5.0 | 8.0 | 10 |
| Mass ratio of second coating layer (mass %) (*2) | | 16 | 16 | 16 | 16 | 16 | 16 |
| Strength retention (1) | | 80% | 85% | 95% | 90% | 85% | 80% |
| Strength retention (2) | | 64% | 70% | 80% | 73% | 63% | 50% |
| Residual rubber ratio (%) | | 90 | 95 | 95 | 90 | 90 | 90 |
| Degree of breakage | | Rubber broken | Rubber broken | Rubber broken | Rubber broken | Rubber broken | Rubber broken |

The mass ratios (*1) and (*2) were obtained in the same manner as the mass ratios (*1) and (*2) in Table 4.

TABLE 6

| | | Comparative Examples | | | | | | | |
|---|---|---|---|---|---|---|---|---|---|
| | | 1 | 2 | 3 | 4 | 5 | 6 | 7 | 8 |
| First coating layer | Treatment agent | — | — | — | — | A | A | C | C |
| | Mass ratio (mass %) (*1) | 0 | 0 | 0 | 0 | 0.3 | 12 | 0.3 | 12 |
| Mass ratio of second coating layer (mass %) (*2) | | 20 (*3) | 11 | 16 | 20 | 16 | 16 | 16 | 16 |
| Strength retention (1) | | 55% | 40% | 70% | 56% | 77% | 71% | 77% | 70% |
| Strength retention (2) | | 33% | 38% | 61% | 43% | 70% | 50% | 60% | 45% |
| Residual rubber ratio (%) | | 25 | 30 | 40 | 30 | 85 | 85 | 80 | 80 |
| Degree of breakage | | Spotted | Spotted | Spotted | Spotted | Rubber broken | Rubber broken | Rubber broken | Rubber broken |

The mass ratios (*1) and (*2) were obtained in the same manner as the mass ratios (*1) and (*2) in Table 4.
(*3) In Comparative Example 1, the second coating layer was formed using a RFL liquid.

As shown in Tables 4 to 6, a carbon fiber cord having high bending fatigue resistance and high adhesiveness could be obtained by forming a predetermined first coating layer with a predetermined mass ratio in the cord.

INDUSTRIAL APPLICABILITY

The present invention is applicable to carbon fiber cords for reinforcing rubber products and to rubber products using the cords.

The invention claimed is:

1. A carbon fiber cord for reinforcing a rubber product, wherein the cord comprises:
    a carbon fiber;
    a first coating layer formed on the carbon fiber; and
    a second coating layer formed over the first coating layer, wherein
    the first coating layer contains a phenolic resin and does not contain a rubber component,
    the second coating layer contains a rubber component and is formed using a treatment agent that contains the rubber component and a crosslinking agent which is at least one of a diisocyanate compound, a polyisocyanate, an aromatic nitroso compound, and a maleimide-based crosslinking agent and does not contain an initial condensate of resorcin and formaldehyde,
    a mass ratio of the first coating layer to a total mass of the carbon fiber and the first coating layer is in a range of from 0.5% to 10%, and
    a mass ratio of the second coating layer to a total mass of the carbon fiber, the first coating layer, and the second coating layer is in a range of from 10% to 25%.

2. The carbon fiber cord according to claim 1, wherein the phenolic resin is a copolymer of resorcin, a phenolic compound other than resorcin, and formaldehyde.

3. The carbon fiber cord according to claim 2, wherein the phenolic compound is parachlorophenol or phenol.

4. The carbon fiber cord according to claim 1, wherein the second coating layer contains hydrogenated nitrile rubber.

5. A rubber product comprising the carbon fiber cord according to claim 1.

6. The carbon fiber cord according to claim 1, wherein the crosslinking agent comprises a diisocyanate compound.

7. The carbon fiber cord according to claim 1, wherein the crosslinking agent comprises a polyisocyanate.

8. The carbon fiber cord according to claim 1, wherein the crosslinking agent comprises an aromatic nitroso compound.

9. The carbon fiber cord according to claim 1, wherein the crosslinking agent comprises a maleimide-based crosslinking agent.

10. The carbon fiber cord according to claim 4, wherein the crosslinking agent comprises a diisocyanate compound.

11. The carbon fiber cord according to claim 4, wherein the crosslinking agent comprises a polyisocyanate.

12. The carbon fiber cord according to claim 4, wherein the crosslinking agent comprises an aromatic nitroso compound.

13. The carbon fiber cord according to claim 4, wherein the crosslinking agent comprises a maleimide-based crosslinking agent.

14. The carbon fiber cord according to claim 4, wherein the hydrogenated nitrile rubber comprises a carboxylated hydrogenated nitrile rubber.

15. The carbon fiber cord according to claim 1, wherein the cord further comprises a third coating layer formed over the second coating layer.

16. The carbon fiber cord according to claim 1, wherein the mass ratio of the second coating layer to the total mass of the carbon fiber, the first coating layer, and the second coating layer is in a range of from 13% to 19%.

17. The carbon fiber cord according to claim 15, wherein a mass ratio of the third coating layer to a total mass of the carbon fiber, the first coating layer, the second coating layer, and the third coating layer is in a range of from 0.5% to 8%.

18. The carbon fiber cord according to claim 15, wherein a mass ratio of the third coating layer to a total mass of the carbon fiber, the first coating layer, the second coating layer, and the third coating layer is in a range of from 1.0% to 5.0%.

19. The carbon fiber cord according to claim 15, wherein a mass ratio of the third coating layer to a total mass of the carbon fiber, the first coating layer, the second coating layer, and the third coating layer is in a range of from 1.8% to 3.8%.

* * * * *